United States Patent [19]

Shaw

[11] Patent Number: 5,393,472

[45] Date of Patent: Feb. 28, 1995

[54] METHOD OF PRODUCING WOLLASTONITE & CERAMIC BODIES CONTAINING WOLLASTONITE

[76] Inventor: John D. Shaw, 9760 Rainier Ave. South, Seattle, Wash. 98118

[21] Appl. No.: 86,332

[22] Filed: Jun. 30, 1993

[51] Int. Cl.[6] ...................... C04B 35/64; C04B 35/02; C01B 33/24
[52] U.S. Cl. ...................... 264/63; 264/66; 423/331; 501/123
[58] Field of Search ............. 264/56, 63, 66, DIG. 31; 423/331, 155, 157; 501/123; 106/470

[56] References Cited

U.S. PATENT DOCUMENTS

| | | | |
|---|---|---|---|
| 3,861,935 | 1/1975 | Ohnemuller et al. | 106/306 |
| 3,926,647 | 12/1975 | Wohrer | 106/39.5 |
| 3,928,054 | 12/1975 | Kubo | 106/120 |
| 3,966,884 | 6/1976 | Jacob | 423/331 |
| 3,967,974 | 6/1976 | Ohnemuller et al. | 106/306 |
| 4,047,968 | 9/1977 | zur Strassen et al. | 106/281 R |
| 4,165,991 | 8/1979 | zur Strassen et al. | 106/63 |
| 4,179,279 | 12/1979 | Harada et al. | 75/24 |
| 4,443,550 | 4/1984 | Kume et al. | 501/65 |

OTHER PUBLICATIONS

"Solid-State Reaction for Producing β-Wollastonite," Ibanez, A. et al., *Ceramic Bulletin* 69 (3):374–378, 1990.
"Wollastonite," Elevatorski, E. A., *Industrial Minerals and Rocks,* 2:5th Ed., 1393–1390, 1983.
"Synthesis of Wollastonite at Low Temperature. Possibilites for Its Use In Ceramic Bodies," Pekeldjiev, G. and Andreeva, V., *Ceramic Powders,* 89–96, 1983.
"Wollastonite and Zeolites," Potter, M. J. and Virta, R. L., *Minerals Yearbook U.S. Dept. of the Inter. Bureau of Mines,* 1990.
"Physical Stabilization of the βγ Transformation in Dicalcium Silicate" Chan, C. J. et al., *J. Am. Ceram. Soc.,* 75 (6):1621–1627, 1992.
"Fast–Fired Wall Tile Bodies Containing Wollastonite," Sainamthip, P. and Reed, J. S., *Am. Ceram. Soc. Bull,* 66 (12):1726–1731 (1987).
"Phase Transformations in Dicalcium Silicate: II, TEM Studies of Crystallography, Microstructure, and Mechanisms," Kim, Y. J. et al., *J. Am. Ceram. Soc.* 75 (9):2407–2419 (1992).
"Phase Transformations in Dicalcium Silicate: I, Fabrication and Phase Stability of Fine-Grained β Phase," Nettleship, I. et al., *J. Am. Ceram. Soc.* 75 (9):2400–2406 (1992).
"Analytical Electron Microscopic Studies of Doped Dicalcium Silicates," Chan, C. J. et al., *J. Am. Ceram. Soc.,* 71 (9):713–719.
"Chemical Preparation and Phase Stability of $Ca_2SiO_4$ and $Sr_2SiO_4$ Powders," Nettleship, I. et al., *Dept. of Mat. Sci. and Engin.,* publication pending.

*Primary Examiner*—Christopher A. Fiorilla
*Attorney, Agent, or Firm*—Seed and Berry

[57] ABSTRACT

A method of using dicalcium silicate, and particularly dicalcium silicate slag, to produce wollastonite. In a particular embodiment, the method is used for the production of ceramic products, such as wall tile, containing wollastonite. The method includes preparing a batch mix comprising dicalcium silicate slag and a silica source, and preferably a fluxing agent, then firing the batch mix to produce wollastonite. The method can further include adding a binder material and water to the batch mix, and then pressing the resulting batch mix to form a desired shape, prior to firing. Also, a composition, such as a ceramic product, than is produced from a dicalcium silicate slag mixed with a silica source and fired such than the dicalcium silicate in the slag and the silica source undergo a phase change to become wollastonite.

16 Claims, 3 Drawing Sheets

METHOD OF PRODUCING WOLLASTONITE & CERAMIC BODIES CONTAINING WOLLASTONITE

TECHNICAL FIELD

The present invention relates to the use of dicalcium silicate to produce wollastonite.

BACKGROUND OF THE INVENTION

Wollastonite is a natural calcium silicate that has a theoretical composition of $CaSiO_3$ (which may also be written $CaO.SiO_2$). The chemical composition of wollastonite is about 48.3% calcia (CaO) and about 51.7% silica ($SiO_2$). One significant use of wollastonite is in ceramics such as wall tile, where it promotes low shrinkage, good strength, low warpage, and fast firing. It is also used in porcelain, as a filler in paint, plastics and papers, as an electrode coating, as a protective slag for continuous casting carbon steel and casting silicon steel sheet, and in asbestos replacement. To produce ceramics, wollastonite has been mixed with clay (an aluminum silicate) and other raw materials in various proportions to make ceramic tile. In order to make a ceramic product, for example, the wollastonite is combined with kaolin clay and nepheline syenite, which is a type of feldspar, and then fired. Sainamthip & Reed, *Am. Ceram. Soc. Bull.* 66(12):1726–31 (1987).

Wollastonite is a relatively rare, naturally occurring mineral, mined in New York in the United States and in various foreign countries. Because of its relative scarcity (and, therefore, high expense), synthetic methods have been devised to produce wollastonite. Such methods have included heating a mixture of silica and limestone with the addition of a fluxing agent to 1100° C. for several hours. It is believed that the long heating time is required because each of the components of the mixture is present in a high melting phase in the mix and because such raw materials need to undergo several chemical steps during the reaction in which wollastonite is formed. Because of the long heating time, and therefore heightened expense, these methods of synthesizing wollastonite have not been suitable for industrial production of wollastonite.

It is believed that one of the major reasons surrounding the successful use of wollastonite in ceramic products is that silica is not present as a separate phase in the ceramic product. Silica has a significantly different thermal coefficient of expansion than the other phases present in the fired ceramic product. It also undergoes a phase transformation during the cooling of the ceramic product. Both of these factors cause cracking of the ceramic product unless a slow cooling rate is used. By eliminating the free silica phase, higher firing and cooling rates can be employed, resulting in a correspondingly higher kiln capacity.

There has gone unmet, however, a need for an inexpensive starting material that can be used to make wollastonite, or a ceramic (or other) product containing wollastonite, that requires a shortened heating time, and a shortened cooling time.

SUMMARY OF THE INVENTION

The present invention is directed to methods of producing wollastonite through the use of dicalcium silicate as a starting material. Preferably, the dicalcium silicate is used to produce a ceramic product comprising wollastonite. It is further preferred to use dicalcium silicate slag (hereinafter "dical slag") as the source of the dicalcium silicate.

Through the use of dical slag, wollastonite or a ceramic product comprising wollastonite can be produced less expensively than when base silica and calcia compounds are used. Further, the present invention has advantages over the use of natural wollastonite in that the dical slag does not necessarily need to be processed prior to its addition to a batch mix, and the dical slag-produced wollastonite has a more uniform composition than naturally occurring wollastonite (which can vary broadly in amount of wollastonite and amount (and variety) of accompanying minerals from one mining location to the next).

Accordingly, in one aspect the present invention provides a method of producing wollastonite from a dicalcium silicate starting material, preferably dical slag, comprising mixing the dicalcium silicate with a silica source, and preferably a fluxing agent, to give a wollastonite batch mix. The wollastonite batch mix is then fired at a sufficient temperature for a sufficient time to form wollastonite. The method may further comprise cooling the heated mixture to ambient temperature at an accelerated rate. When added to the wollastonite batch mix as a starting material, the dical slag may be either at ambient temperature or molten; when molten, the step of firing is preferably performed prior to substantial cooling of the wollastonite batch mix, thereby utilizing the residual heat present in the dical slag to reduce or eliminate the amount of heat that is supplied for firing.

In a further aspect, the present invention provides a method of producing a ceramic product comprising wollastonite. The method comprises mixing dical slag with a silica source, a fluxing agent and a binder material (such as clay) to produce a ceramic batch mix; adding a sufficient amount of water to the ceramic batch mix to permit the mix and water to retain a desired shape; pressing the ceramic batch mix and water into the desired shape; and firing the desired shape to produce the ceramic product. The desired shape may be dried in a separate step prior to firing, preferably by heating to a temperature of about 200° C. at the rate of about 300° C. per hour for about 60 minutes.

The batch mix is preferably fired by heating to temperatures of generally about 870° C. to about 1475° C., typically about 1000° C. to about 1250° C., and preferably about 1050° C. to about 1175° C. Such firing temperatures are attained at the rate of about 300° C. to about 2100° C. per hour, and preferably at the rate of about 500° C. per hour in a traditional furnace or about 2000° C. per hour in a fast-fire furnace. When fast fired, the firing temperature is maintained generally for about 2 minutes to about 45 minutes, typically for about 3 minutes to about 30 minutes, and preferably for about 5 minutes to about 10 minutes. When traditionally fired, the firing temperature may be maintained for about 1 hour to about 8 hours or more. The resulting fired, desired shape may then be cooled to ambient temperature at an accelerated rate, up to about 700° C. per hour or more.

In preferred embodiments, the wollastonite batch mix consists essentially of dical slag, silica sand, and a fluxing agent, and the ceramic batch mix consists essentially of dical slag, silica sand, fluxing agent and a binder material. In a further preferred embodiment, the ceramic batch mix comprises about 50% dical slag, about 30% silica sand, about 10% cullet and about 10% clay, by weight. (Unless otherwise indicated, all percentages herein are by weight.) In accordance with such embodiments, the components of the batch mix, the time period of firing and the temperature of firing are preferably selected such that the wollastonite comprises up to about 80% or more of the resulting product. Where the product is a ceramic product, such factors may be selected such that the ceramic product typically comprises about 5% to about 80% wollastonite, preferably about 70% to about 75% wollastonite, and further preferably about 72% wollastonite. Selection of an appropriate percentage relates to factors such as material costs and desired end properties; such selection is well within the skill of those in the art.

In still a further aspect, the present invention provides a composition comprising wollastonite. The composition is produced by mixing dical slag with a silica source to give a wollastonite batch mix, then firing the wollastonite batch mix, preferably in the presence of a fluxing agent, at a sufficient temperature and for a sufficient time such that dicalcium silicate from the slag and the silica undergo a phase change to produce the wollastonite. Preferably, the composition is a ceramic product and its production further comprises mixing the wollastonite batch mix with a binder material and water, pressing the resulting mixture into a desired shape, drying the desired shape, and then firing the desired shape.

These and other aspects of the present invention will become evident upon reference to the following detailed description and attached drawings.

DETAILED DESCRIPTION OF THE INVENTION

The present invention is directed to a method of producing wollastonite using a dicalcium silicate starting material, preferably from dical slag. The wollastonite is then used to produce a wollastonite-containing product, such as those discussed above, including ceramic products such as ceramic wall tile. In a preferred embodiment, the dical slag is used directly (without intermediate isolation) to produce a wollastonite-containing ceramic product.

Dical slag is a waste product from the magnetherm process for making magnesium from dolomite. Dical slag is available, for example, from Northwest Alloys, Inc., Addy, Wash. U.S.A. 99101, as well as from other sources using such a magnetherm method. Dical slag comprises the following compounds and characteristics:

TABLE I

| Chemical Analysis | | | Size Analysis | | |
|---|---|---|---|---|---|
| Item | Wt. % | St. Dev. | Mesh | Microns | % Passing |
| $SiO_2$ | 23.6 | 0.63 | 200 | 75.0 | 97 |
| CaO | 57.0 | 0.47 | 325 | 44.5 | 87 |
| $Al_2O_3$ | 14.1 | 0.44 | 400 | 38.5 | 80 |
| MgO | 4.6 | 0.29 | | 30.0 | 65 |
| $Na_2O$ | 0.46 | | | 20.0 | 42 |
| $K_2O$ | Tr | | | 10.0 | 17 |
| $Fe_2O_3$ | 0.13 | 0.03 | Melting Temperature | | |
| $P_2O_5$ | 0.02 | | 1550° C.–1600° C. | | |
| $TiO_2$ | 0.02 | | pH of Saturated Water | | |
| $So_3$ | 0.01 | | 10.5–11.5 | | |
| X-Ray Analysis | | | L.O.I. @ 700 degrees C. | | |
| $Ca_2SiO_4$ | 55%–65% | | 0.06–0.7 | | |
| $Ca_{12}Al_{14}O_{33}$ | 20%–30% | | Bulk Density | | |
| MgO | 3%–5% | | loose | 53 lbs/ft³ | |
| CaO | 0–5% | | tamped | 75 lbs/ft³ | |
| $Fe_2O_3$ | 0.1%–0.25% | | | | |

Note: All numbers are mean values.

Figure 1:
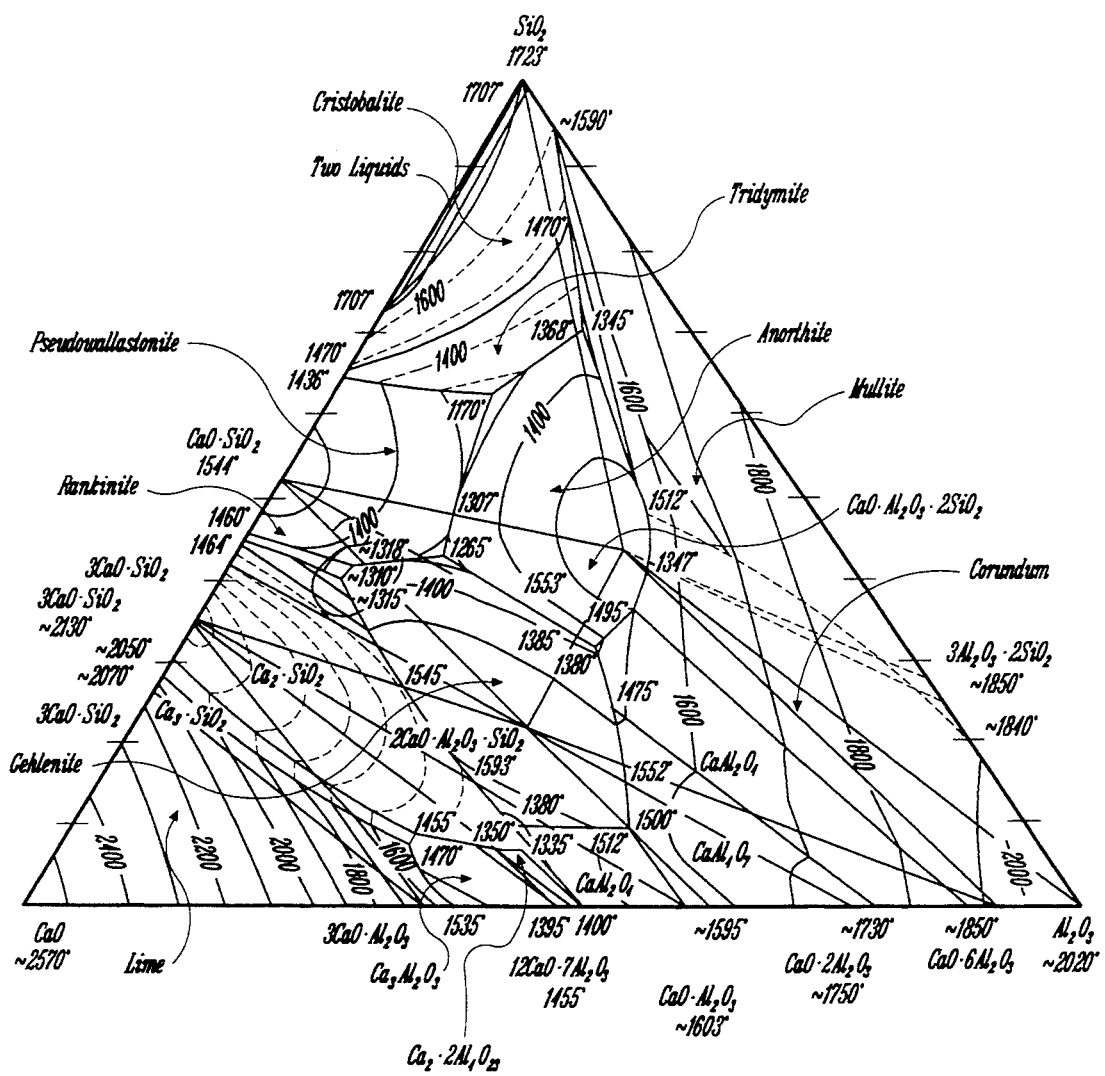
FIG. 1 depicts a phase diagram for alumina ($Al_2O_3$), calcia (CaO) and silica ($SiO_2$). The crystalline phases noted in the Figure represent the following oxide formulas: cristobalite and tridymite, $SiO_2$; pseudowollastonite, $CaO.SiO_2$, rankinite, $3CaO.2SiO_2$; lime, CaO; corundum, $Al_2O_3$; mullite, $3Al_2O_3.SiO_2$; anorthite, $CaO.Al_2O_3.2SiO_2$; and gehlenite, $2CaO.Al_2O_3.SiO_2$. Temperatures up to approximately 1550° C. are on the Geophysical Laboratory Scale; those above 1550° C. are on the 1948 International Scale.
Figure 2:
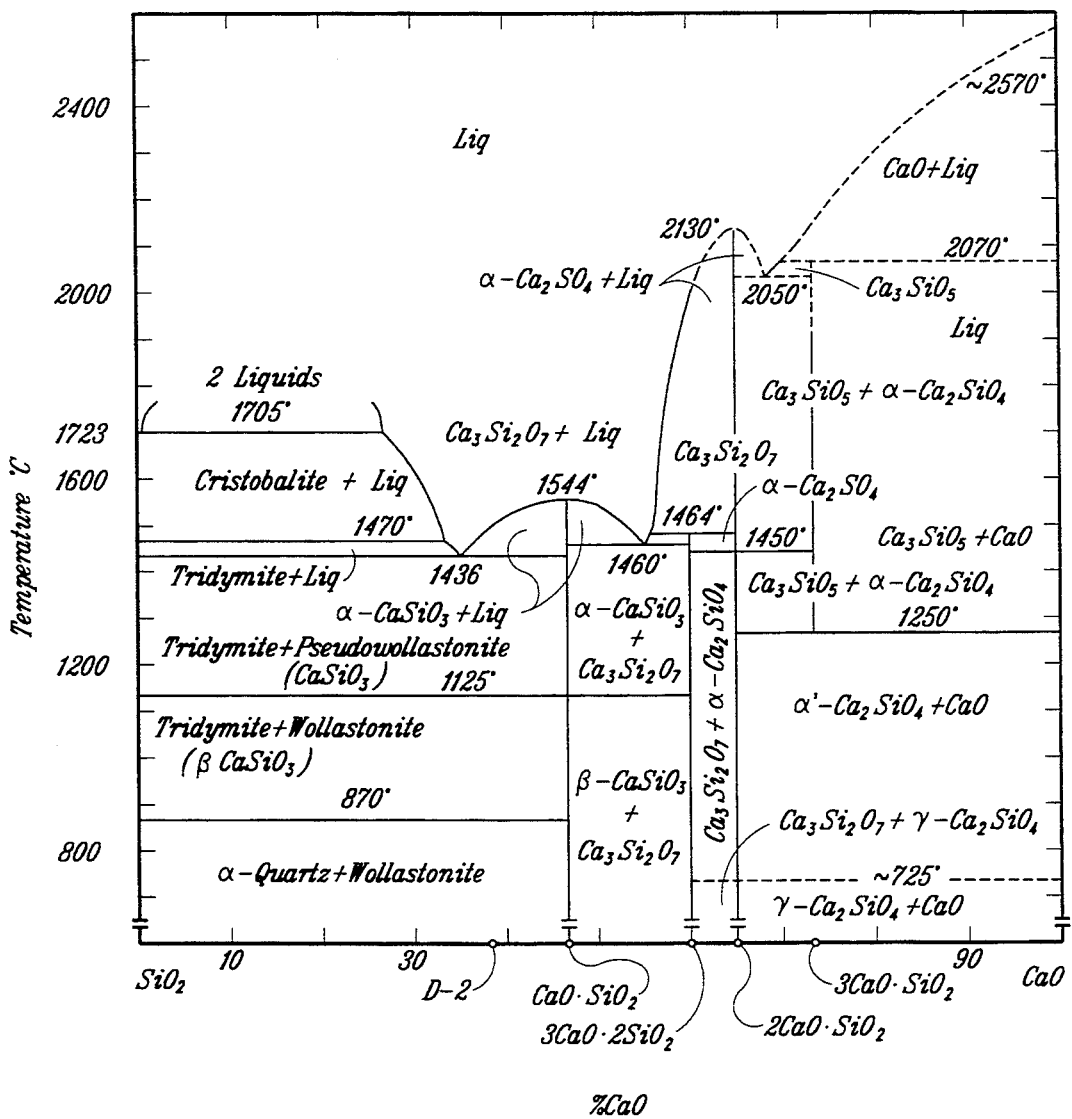
FIG. 2 depicts a phase diagram for calcia and silica.
Figure 3:
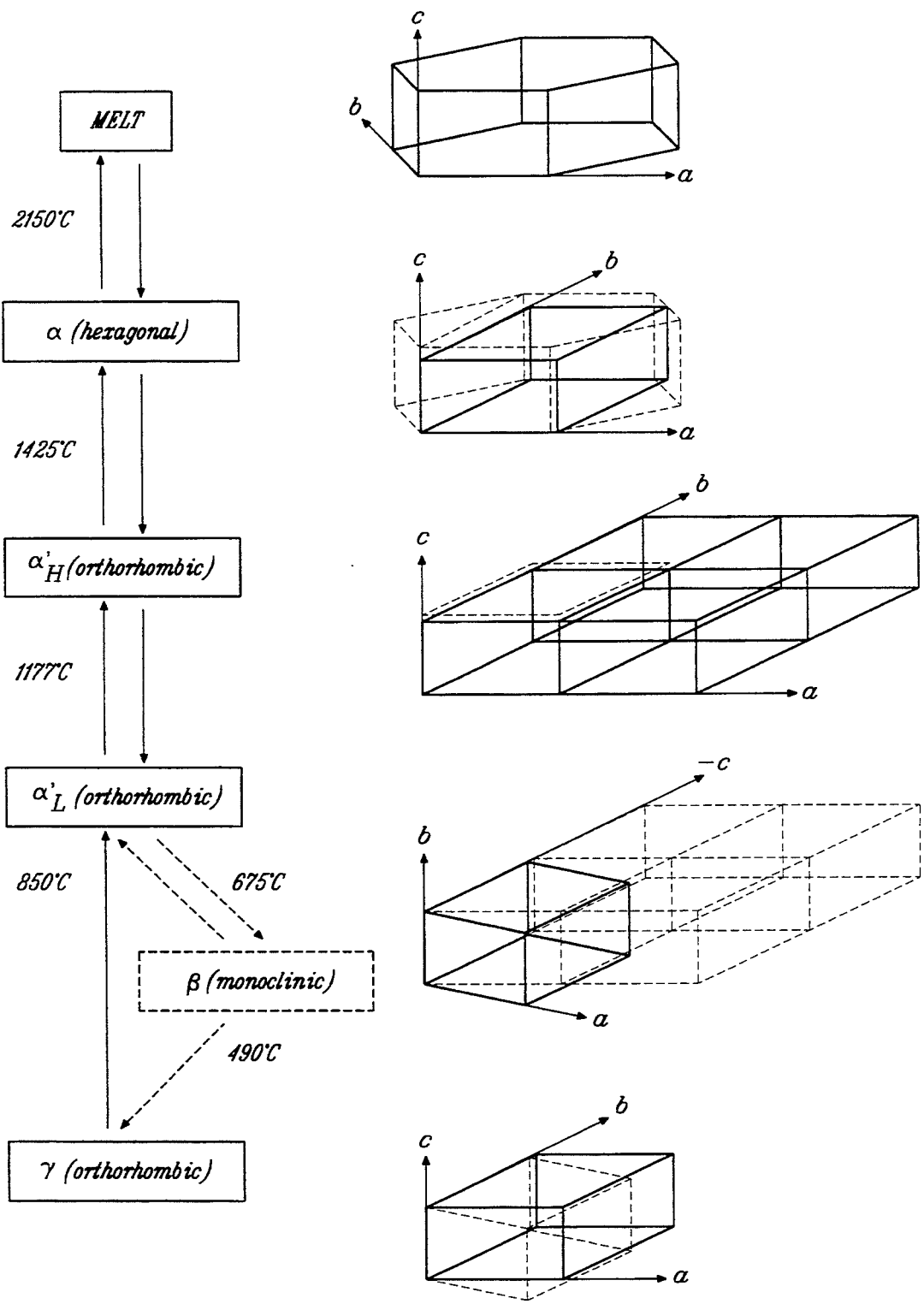
FIG. 3 depicts the polymorphism of dicalcium silicate, $Ca_2SiO_4$.

As indicated in the phase diagrams depicted in FIGS. 1 and 2, addition of sufficient additional silica to the dical slag, coupled with sufficient heat, results in a chemical composition that produces wollastonite. At equilibrium after heating to a sufficient temperature, the product comprises about 80% wollastonite. The phase diagrams of FIGS. 1 and 2 identify both the low temperature form of wollastonite and the high temperature form of wollastonite (also known as pseudowollastonite); both forms are included within the scope of the instant invention. In FIG. 2, the phase diagram discloses several polymorphs of dicalcium silicate, and their relationship to wollastonite. FIG. 3 depicts the crystalline structure of the polymorphs of dicalcium silicate, as well as the temperatures at which transitions from one polymorphic stage to the next take place. The use of dical slag results in a more economical method of making wollastonite because the dical slag comprises, in significant part, dicalcium silicate ($Ca_2SiO_4$).

Accordingly, the present invention provides a method of using such dical slag as a starting material to produce wollastonite, which can then be used to produce a wollastonite-containing product. For example, the wollastonite can be used as the major ingredient for a ceramic product, such as a ceramic body. In an alternative embodiment, the dical slag can be used directly as an ingredient in a batch mix, for the production of a ceramic product comprising wollastonite. In the latter embodiment, wollastonite is made in situ during the firing process.

When dical slag is used to produce the wollastonite, the resulting product is a novel composition. In particular, the composition comprises, in conjunction with the wollastonite, MgO, and other elements and compounds that have not previously been associated with wollastonite products. In the case where the wollastonite comprising product is a ceramic product, the ceramic product has a higher density than ceramic products produced from traditional wollastonite sources.

Turning to the steps of the method of the present invention, a first step comprises mixing dicalcium silicate, preferably dical slag, with a silica source to produce a wollastonite batch mix.

A fluxing agent that promotes the chemical reaction that produces wollastonite is preferably added to the wollastonite batch mix. The fluxing agent is preferably a sodium compound and comprises about 5% to about 10% of the wollastonite batch mix. Further, the fluxing agent preferably comprises sodium carbonate or cullet, which is waste glass. The fluxing agent preferably has a melting temperature near 700° C. and thus readily produces a fluid phase below the typical firing temperature of the wollastonite batch mix. It is believed that the presence of the fluid phase facilitates the reaction using dicalcium silicate to produce wollastonite.

In a preferred embodiment, the wollastonite batch mix comprises a ceramic batch mix. In such a ceramic batch mix, a binder material, such as clay, is added to the mix. In such an embodiment, the wollastonite is produced in situ in the ceramic product during the firing step.

The desired batch mix composition for making the ceramic tile will vary, depending on the chemical composition of the various raw materials available, and to some degree the desired properties of the product being produced. As discussed above, dical slag is a mixture comprising calcia, silica, and alumina. The other ingredients of the batch mix are preferably selected to adjust the batch mix chemical composition to correspond to the desired point in the phase diagrams of FIGS. 1 and 2. Accordingly, the additives are generally compounds of calcia, silica and alumina. In a preferred embodiment, the relative proportions of the individual ingredients in the batch mix are selected to place the fired ceramic product on the calcia-silica-alumina phase diagram near, and just to the silicon side of, the wollastonite-anorthite line. Such a mixture will yield a maximum percentage of wollastonite after firing. In such a preferred embodiment, the fired product will comprise up to about 80% or more wollastonite. In the case of a ceramic product, the ceramic batch mix may preferably be selected such that the fired product is from about 5% to about 80% wollastonite.

In preferred embodiments, the wollastonite batch mix consists essentially of dical slag, silica sand and a fluxing agent, and the ceramic batch mix consists essentially of dical slag, silica sand, a fluxing agent and a binder material. Such mixtures may also include one or more pigments or water, or other additives that do not significantly affect the transition of the dicalcium silicate of the dical slag to wollastonite (of course, such additives can also be added to the other mixtures herein). Selection of an appropriate batch mix is well within the skill of those in the art.

The components of the batch mix are preferably ground to the desired particle size. Alternatively, the components can be individually ground before mixing. As a further alternative, the components of the batch mix, or the batch mix itself, can be pelletized to reduce dust losses in the firing process.

Where the batch mix is a ceramic batch mix, a sufficient amount of water may be added to the mix to permit the mix and water to retain a desired shape. In the instance where the binder material already contains a sufficient amount of water to permit the mix to retain the desired shape, no water need be added. The ceramic batch mix and water are then pressed into the shape of a desired ceramic product. Of course, a wollastonite batch mix can be similarly processed to produce a desired shape. Selecting the amount of water is well within the skill of those in the art.

As a second step, the batch mix is fired. In the case where the batch mix contains water, the shaped mixture may be dried before it is fired. Drying is preferably performed by heating the shaped mixture to about 200° C. at the rate of about 300° C. per hour. Preferably, the shaped mixture is dried for about 60 minutes. Alternatively, the shaped mixture is dried as a part of the firing step. The period for drying will vary according to factors such as the amount of water that has been added, the thickness and surface area of the desired shape, and the amount of heat that has been applied. Selection of appropriate drying temperatures, rates and times, whether as a separate step or as a part of the firing step, is well within the skill of those in the art.

The firing temperature is preferably low enough that the batch mix does not become soft, yet must be high enough that the conversion to wollastonite is permitted. The batch mix is fired by heating to generally about 870° C. to about 1475° C., typically about 1000° C. to 1250° C., and preferably about 1050° C. to about 1175° C., at the rate of about 300° C. per hour to about 2000° C. per hour or more. The batch mix is maintained at the firing temperature for a sufficient time for the silica to be consumed by the dicalcium silicate, preferably yielding a ceramic product that comprises wollastonite. A sufficient time permits the conversion of the batch mix into wollastonite, and preferably allows the batch mix to reach an equilibrium state. The sufficient time is selected such that a desired proportion of wollastonite in the product is achieved. In a preferred embodiment, the product is a ceramic product that comprises up to about 80% wollastonite. Such a sufficient time, when fast fired, is generally from about 2 minutes to about 45 minutes, typically about 3 minutes to 30 minutes, and preferably about 5 minutes to 10 minutes. The time will be significantly greater when traditional firing methods are used. The time will depend both upon the type of kiln and the temperatures that are being employed. Selection of appropriate firing temperatures, rates and times is well within the skill of those in the art.

The fired product is then cooled to ambient temperature. The fired product can be cooled at an accelerated rate, as quickly as about 700° C. per hour or faster. Selection of appropriate cooling times, rates and temperatures is well within the skill of those in the art.

In one embodiment, wherein the first and second steps may be effectively combined, the dical slag is taken directly, in its molten state, from the magnetherm furnace, silica is added, and the mixture is fired at an appropriate temperature to produce wollastonite. If desired, this process may take advantage of the residual heat contained in the dical slag by firing the batch mix prior to substantial cooling of the batch mix. Taking advantage of such residual heat reduces the amount of heat that is needed for firing, and potentially allows the use of dical slag to produce wollastonite without the addition of further heat. The product is later cooled, and the product can be granulated (or water quenched) as a part of such cooling.

The following examples are provided by way of illustration, and not by way of limitation.

EXAMPLES

Example 1

A batch mix was produced having a ratio of 100 gm of dical slag to 56.5 gm of silica sand to 18.6 gm of sodium carbonate. After mixing the components, three samples were placed in a muffle furnace at 1000° C. The first sample was removed from the furnace after 2 hours, the second sample was removed after 4 hours and the third sample was left in the furnace with the furnace shut off at the end of 4 hours. X-ray analysis of the three samples showed the most abundant phase to be wollastonite in each of the samples. Quartz (SiO₂) was found in each of the first two samples, but was not found in the third sample.

Example 2

A batch mix was prepared comprising 50% dical slag, 30% silica sand, 10% cullet and 10% clay (kaolinite). A sufficient amount of water was then added to the batch mix to allow the batch mix to retain a desired shape. The batch mix was then pressed into the desired shape, a tile. The tile was then heated to about 200° C. at the rate of about 300° C. per hour in order to dry the tile. Once dried, the tile was fired by heating to about 1050° C. at the rate of about 500° C. per hour. The tile was fired at this temperature for about 30 minutes, during which time silica was consumed by dicalcium silicate from the dical slag, forming wollastonite. The fired tile was then cooled to ambient temperature at the rate of about 700° C. per hour.

The present embodiments of this invention are to be considered in all respects as illustrative and not restrictive, the scope of the invention being indicated by the appended claims rather than by the foregoing description, and all changes that come within the meaning and range of equivalency of the claims are therefore intended to be embraced therein.

What is claimed is:

1. A method of preparing a product comprising wollastonite, comprising the steps of:
    (a) mixing a dicalcium silicate slag, a silica source, and a fluxing agent to produce a batch mix; and then
    (b) firing said batch mix at a sufficient temperature and for a sufficient time such that silica is consumed by dicalcium silicate from the dicalcium silicate slag thereby forming said product comprising wollastonite.

2. The method of claim 1 wherein, in step (a), said dicalcium silicate slag is removed from a magnetherm furnace in a molten state and said silica source is added to said dicalcium silicate slag in said molten state.

3. The method of claim 2 wherein the step of firing is performed prior to substantial cooling of the batch mix.

4. The method of claim 1 wherein said method further comprises:
    (c) cooling said to ambient temperature at an accelerated rate.

5. The method of claim 1 further comprising between step (a) and step (b) :
    adding a binder material to said batch mix;
    adding a sufficient mount of water to said batch mix and said binder to permit said batch mix and water to retain a desired shape; and
    pressing said batch mix, binder and water into a desired shape.

6. The method of claim 1 wherein, in step (b), said batch mix is fired at about 1000° C. to about 1250° C. for about 5 minutes to about 10 minutes.

7. The method of claim 1 wherein said batch mix consists essentially of dicalcium silicate slag, silica sand and a fluxing agent.

8. The method of claim 1 wherein said wollastonite comprises about 80% by weight of said product.

9. A method of producing a ceramic product comprising wollastonite, comprising:
    (a) mixing dicalcium silicate slag with a silica source, a clay binder material, water, and a fluxing agent to produce a ceramic batch mix;
    (b) pressing said ceramic batch mix into a desired shape; and
    (c) firing the resulting desired shape such that silica is consumed by dicalcium silicate from the dicalcium silicate slag thereby producing a ceramic product comprising wollastonite.

10. The method of claim 9 wherein, prior to step (b), a sufficient amount of water is added to said ceramic batch mix to permit the ceramic batch mix and water to retain a desired shape.

11. The method of claim 9 wherein, subsequent to step (b) said ceramic batch mix and water is subjected to a drying step.

12. The method of claim 11 wherein said drying is performed by heating the desired shape to a temperature of about 200° C. at the rate of about 300° C. per hour, and said firing is performed by heating the dried shape at about 1000° C. to about 1250° C., for about 5 minutes to about 10 minutes.

13. The method of claim 9 wherein said ceramic batch mix consists essentially of dicalcium silicate slag, silica sand, binder material and said fluxing agent.

14. The method of claim 9 wherein said ceramic batch mix comprises about 50% dicalcium silicate slag, about 30% silica sand, about 10% cullet and about 10% clay, by weight.

15. The method of claim 9 wherein said wollastonite comprises about 70% to about 80% by weight of said ceramic product.

16. The method of claim 15 wherein said ceramic product comprises a wall tile.

* * * * *

UNITED STATES PATENT AND TRADEMARK OFFICE
CERTIFICATE OF CORRECTION

PATENT NO.   : 5,393,472

DATED        : February 28, 1995

INVENTOR(S)  : John D. Shaw

It is certified that error appears in the above-identified patent and that said Letters Patent is hereby corrected as shown below:

In column 7, claim 4, line 46, after "said" and before "to", please insert --product--.

Signed and Sealed this

Nineteenth Day of September, 1995

Attest:

BRUCE LEHMAN

Attesting Officer   Commissioner of Patents and Trademarks